United States Patent Office 3,369,889
Patented Feb. 20, 1968

3,369,889
PRODUCTION OF SPHEROIDAL URANIUM
METAL POWDER
Paul E. Trent, Norris, Tenn., assignor to the United States of America as represented by the United States Atomic Energy Commission
No Drawing. Filed July 6, 1967, Ser. No. 651,630
6 Claims. (Cl. 75—84.1)

ABSTRACT OF THE DISCLOSURE

Spheroidal uranium metal powder in a size range of −44 to +840 microns ($\mu$) is produced in a reaction vessel by the exothermic reaction of uranium dioxide with a calcuim metal reductant and an iodine booster. Particulate uranium metal is incorporated in the reaction mixture in a uranium metal to uraniun dioxide ratio of about 9-to-10 by weight for controlling the particle size of the spheroidal product to assure that about 85 percent of the spheroidal product is of a size greater than 44 microns with the largest single fraction of the spheroidal product being in a preferred size range of 149 to 420 microns.

---

The present invention relates generally to the production of spheroidal uranium powder by the reduction of uranium dioxide with a calcium metal reductant, and more particularly to the production of such powder by utilizing particulate uranium metal and an iodine booster together with the calcium reductant for increasing the particle size of the spheroidal uranium product and the yield of such product in a selected size range. This invention was made in the course of, or under, a contract with the U.S. Atomic Energy Commission.

Spheroidal uranium metal powder has been previously produced by practicing bomb-reduction techniques which usually follow accepted procedures of admixing a charge of uranium oxide powder and a reducing agent such as particulate magnesium or calcium metal, loading this mixture into a reaction vessel, and thereafter heating the vessel and its contents to and beyond a temperature sufficient to initiate an exothermic reaction between the reductant and the uranium oxide. This reaction effects the removal of the oxide from the uranium while the additional heating sufficiently melts this particulate uranium metal to produce spheroidal configurations. Upon completion of the reaction the reaction cake which consists primarily of agglomerates of spheroidal and non-spheroidal uranium metal particulates and a slag compound of the reductant and other impurities may then be subjected to an acid leaching or crushing operation to separate the particulate uranium from the slag. About 95 percent of the spheroidal uranium metal produced by this procedure is of a size less than 44 microns (−325 mesh) and somewhat pyrophoric while the remaining larger spheroids are usually heavily contaminated with the reductant.

Spheroidal uranium metal powders are becoming of increasing importance in the dynamic field of nuclear energy, such as, for example, in the development of nuclear reactor fuel elements. In order to utilize these spheroidal powders in a most advantageous manner the powders should be of a size greater than about 149 microns (100 mesh) and preferably in a size range of 149 to 420 microns. The −44 micron spheroidal uranium powder produced by the above reduction method is too fine for these applications and the small fraction of the larger spheroids (greater than 44 microns) are too heavily contaminated for receiving favorable consideration. Consequently, investigations have been conducted in an effort to develop a procedure for efficiently producing spheroidal uranium powders of a size ranging upwards from about 149 microns. These investigations led to the development of improved bomb-reduction procedures which have been somewhat successful in increasing the size of the spheroidal uranium particulates and the percentage of such larger particulates produced in any one reduction operation. For example, one of these previous procedures found to be somewhat successful involves the typical bomb reduction of uranium dioxide ($UO_2$) with a calcium metal reductant in an amount in excess of the stoichiometric requirements for dissolving the calcium oxide produced by the reaction but differing therefrom by the addition of about 2 to 10 percent calcium chloride. This additive acts as a fluxing agent to lower the melting point of the calcium oxide slag and thereby decrease its viscosity at the maximum temperature encountered in the reaction vessel for facilitating the coalescing of the uranium powders and the formation of spheroidal particulates from the molten coalesced uranium powders. Increasing the holding time of the vessel and its contents at or near this maximum temperature was also found to be helpful in promoting additional coalescence for increasing the size of the spheroids as well as facilitating the formation of spheroidal bodies. This improved bomb-reduction procedure provides a greater yield of uranium metal spheroids in a size range above 44 microns than previously enjoyed but the percentage of spheroids in a size range above about 149 microns still remained relatively small. It is believed that the reason for not obtaining a larger precentage of spheroids in the +149 micron range is due to the fact that while the fluxing agent provides some increase in particulate size the effect of the fluxing action by itself is not sufficient for satisfactorily increasing the percentage of yield in the size range desired.

Another of the bomb-reduction procedures developed for providing larger speroidal uranium metal powder involves a departure from the usual bomb-reduction techniques employed in the production of spheroidal uranium metal. This procedure utilizes uranium trioxide ($UO_3$) in place of the uranium dioxide previously reduced but is otherwise somewhat similar to the improved procedure just described in that a calcium chloride fluxing agent is used with a calcium metal reductant for providing the desired reaction and spheroidal product. The uranium trioxide employed in this operation is "moist" (dried at 180° C.) since apparently larger uranium metal spheroids can be produced with the so-called moist $UO_3$ than when using uranium trioxide dried at a higher temperature, e.g., 450° C. In a typical bomb-reduction operation using moist uranium trioxide powder, the spheroidal uranium powders range in size from −44 microns to +840 microns (+20 mesh) with about 35 percent of the spheroids being of a size greater than about 149 microns including about 14 percent in the preferred size range of 149 to 420 microns. This procedure represents a substantial improvement over the initial spheroidal uranium powder production techniques with respect to the formation of a greater percentage of the larger uranium metal spheroids per each bomb reduction. However, some drawbacks are inherently present when using uranium trioxide that tend to detract from the desirability of this reduction technique. For example, the reduction of uranium trioxide with calcium results in the formation of more oxide slag than when reducing uranium dioxide and therefore requires the use of more reductant and flux in the reduction operation. Also, the use of uranium trioxide in place of the uranium dioxide in the reduction is somewhat more hazardous in that the excess oxygen in the former tends to create conditions more susceptible to explosions during the reduction operation.

While the bomb-reduction techniques resulting from investigations for increasing the size and yield of spheroidal uranium metal powders such as briefly described above exhibit marked improvements over the bomb-reduction procedure initially employed for producing spheroidal uranium, there are still shortcomings or drawbacks which should be obviated or minimized in order to provide for the production of such spheroidal powders in a more acceptable manner with respect to efficiency and economics. For example, the reduction of moist uranium trioxide with a calcium reductant and a calcium chloride flux apparently produces a greater quantity of larger spheroids than previously obtainable, but, as pointed out above, this procedure is somewhat more expensive and troublesome than desired, particularly when considered from a large scale production standpoint. Further, none of the previous reduction techniques have been found to provide a sufficient percentage of spheroidal uranium powders in the preferred size range of 149 to 420 microns to make the reduction operation economically acceptable. This latter problem is even further aggravated by the fact the majority, i.e., the greatest percentage, of the spheroidal powders produced in the previous reduction operations are in the −149 micron size range. Consequentially, there is, in effect, created an undesirable production characteristic which detracts from the overall efficiency of the reduction operation since these smaller powders are outside of the preferred size range for spheroids useable in the manner envisioned and, therefore, for such purposes represent unwanted or undesirable production. However, some gain is derived from the production of the smaller spheroids since they may be placed in storage for possible employment in other applications, but this gain may also be minimized by the fact that an excess quantity of such small spheroids may be produced if a substantial quantity of spheroids in the preferred size range are desired.

It is the aim of the present invention to obviate or minimize the above and other shortcomings by providing a novel bomb-type reduction process which enjoys a substantial improvement over previously known spheroidal uranium production techniques. The process of the present invention generally comprises the steps of forming a conventional bomb-reduction mix of particulate $UO_2$ and calcium metal and adding to this mixture particulate uranium metal in the −149 micron range and crystalline iodine. The mixture is then charged into a reaction vessel, heated to a temperature sufficient to effect the exothermic reaction, and thereafter further heated to and maintained for a predetermined duration at a temperature in a range of about 1175° to 1225° C. The addition of the uranium metal powders to the reaction mixture provides a unique feature in that these powders function as "seed" to, in effect, establish a mechanism by which the coalescence of molten uranium metal seed and the newly reduced uranium metal is controllable to produce a significant percentage of spheroidal uranium metal in the desired size range. The addition of the iodine powder to the reaction mixture functions as a booster to effect a more exothermic reaction for improving the spheroidicity of the uranium product. The advantages obtained by employing the process of the present invention for the production of spheroidal uranium metal powders are extensive. For example, in a typical reduction using the present process about 50 percent of the spheroids are in the +149 micron range with the desired 149 to 420 micron uranium spheroids forming the largest single fraction produced since the spheroids in this size range account for approximately 30 percent of the total uranium metal present in the reaction. Thus, the present invention enjoys a marked improvement over the previous spheroidal uranium production techniques since the percentage of the spheroids in the desired size range is substantially greater than previously obtainable. Another advantage afforded by the present invention over the previous reduction techniques is in the use of spheroidal uranium powder in the +44 −149 micron range as seed material. In other words, the portion of the product least desirable as product, per se, i.e., the spheroids in the +44−149 range, is most desirable as seed material for subsequent reductions. This use of the fine spheroidal uranium as seed greatly improves the economics and efficiency of the present reduction process since a significantly greater percentage of the total uranium metal involved in the reaction can be fabricated into spheroids in the desired +149−420 micron size range than by practicing previously known reduction techniques.

An object of the present invention is to provide a new and improved uranium reduction process for producing spheroidal uranium metal.

Another object of the present invention is to provide a uranium dioxide reduction process capable of producing quantities of spheroidal uranium metal powders of a desirable size range of +149−420 microns in a manner substantially more economical and efficient than previously available.

A further object of the present invention is to produce spheroidal uranium metal powders by reducing uranium dioxide with a calcium reductant and controlling the size range of such powders by utilizing particulate uranium metal in the reduction reaction.

Other and further objects of the invention will be obvious upon an understanding of the illustrative bomb-reduction process about to be described, or will be indicated in the appended claims, and various advantages not referred to herein will occur to one skilled in the art upon employment of the invention in practice.

As briefly mentioned above, it has been found desirable to find a process by which spheroidal uranium metal powders in a size range of 149 to 420 microns may be efficiently and economically produced. Investigations of the several methods available for producing uranium spheroids, the bomb-reduction of uranium dioxide with a calcium metal reductant appeared to be the most promising since some improvements in the size of the spheroids have been obtained during previous investigations such as those described above. Generally, the formation of spheroidal uranium by bomb-reduction is accomplished by admixing uranium dioxide powder with a reducing agent such as calcium metal and thereafter effecting an exothermic reaction of this mixture in a reaction vessel for reducing the uranium dioxide to uranium metal. Some coalescence and spheroidization of the uranium metal powder is obtained by the additional heating of the reactants. In accordance with the present invention, it was found that the addition of uranium metal powder to this basic bomb-reduction mixture influences the reaction in such a manner that of the spheroids produced a substantially greater percentage than previously obtainable are in the preferred size range of +149–420 microns. It was also found that the addition of iodine powder to the reduction mixture of uranium dioxide, calcium metal, and uranium metal effected a more exothermic reaction and the formation of a more spherical uranium particle.

Described in greater detail, the improved bomb-reduction process of the present invention comprises the steps of admixing particulate uranium dioxide, uranium metal (seed), iodine, and calcium metal in a quantity in excess of the stoichiometric quantity, charging the mixture into a reaction vessel, slowly heating the vessel and its contents to a temperature sufficient to initiate an exothermic reaction (approximately 800° C.), thereafter rapidly heating the charged vessel to a temperature of about 1200° C., and maintaining the charged vessel at approximately 1200° C. for a duration sufficient to provide the desired coalescence and spheroidicity of the uranium metal particulates. Upon completion of the holding period at the elevated temperature the charged vessel is cooled and the spheroidal uranium metal product is then separated from the other products of the reaction, i.e., the slag, and classified, as will be described in detail below.

In order to obtain uranium metal powder exhibiting the most desirable spheroidicity and also the highest yield of such powders in the +149–420 micron range, the ratios of the reactants in the bomb-reduction charge must be maintained within certain ranges. Perhaps the most critical of these ratios is that of the uranium dioxide to the uranium metal seed in that a reaction containing no uranium seed the particle size of the product is substantially uncontrollable and is usually in the −44 micron range while the use of too little or too much uranium seed results in insufficient coalescence and uncontrolled coalescence, respectively. It has been found that a uranium dioxide-to-uranium metal seed ratio of about 10 to 9 based on weight provides the most desirable results. This ratio may be varied by as much as about 5 percent without the undesirable effect of decreasing the yield of the spheroidal product in the desired size range. The size of the uranium metal powder (seed) added to the other reaction components found to provide the most desirable results is a mixture of powder in the +44–149 micron size range. Thus, as briefly mentioned above, the +44–149 material remaining after the larger and smaller particles have been separated from a reacted reduction batch can be added to a subsequent batch as the uranium metal seed.

The other reactants—namely, the calcium metal and the iodine, have also been found to have significant influence on the product size and the spheroidicity thereof when the relative quantities of these reactants are maintained within a certain range. For example, the quantity of calcium metal found most desirable is in a range of about 18 to 22 percent in excess of the stoichiometric quantity. The quantity of iodine powder used in the reaction is preferably in a range of about 4 to 8 percent (by weight) of the uranium dioxide quantity. The iodine in addition to functioning as a thermal booster for effecting a more exothermic reaction of the reactants and enhancing the spheroidicity also causes the formation of a more friable slag button which facilitates the separation of the uranium product from the slag. Further, the formation of a friable slag button also eliminates the grinding step which is normally used to break up the relatively hard, fused slag buttons and is somewhat objectionable from a dust, health physics, and fire hazard standpoint.

In order to effect a desiarble reaction of the bomb-reduction charge prepared in accordance with the present invention the following heating procedure is preferred. The reaction vessel and its contents are slowly heated to a temperature just below the exothermic reaction-initiating temperature of approximately 700° C. for assuring a uniform preheat of the reactants and for preventing the premature initiation of the reaction. Then with an even slower rate of temperature increase the vessel and its contents are further heated until the exothermic reaction becomes evident. At this time the heating is accelerated as fast as possible to a maximum temperature of 1175° to 1225° C. with approximately 1200° C. being the preferred temperature. The maximum temperature is then maintained for a period of about 0.5 to 5 hours with at least a 2-hour holding period being preferred for the production of the desired spheroidal particles sizes. During this holding or high-temperature soak period the newly reduced uranium metal and the uranium metal seed are in a somewhat molten stage and coalesce to form the individual uranium particulates. It is believed that the uranium metal seed has its greatest influence and control upon the growth of the particulates during this period. However, the particular mechanism by which the seed exerts this influence and control is not clearly understood at the present time. It may be theorized that since the uranium metal seed does not become involved in the reduction reaction in the same manner as the uranium dioxide there is a substantially greater quantity of uranium metal in the slag mass than normally available. In other words, the quantity of slag is that which is normally obtained for the reduction of a given quantity of uranium dioxide. Consequently, with a greater quantity of particulate uranium metal available in the slag the coalescence of larger spheroidal particles is somewhat enhanced. This formation of the larger spheroids is also aided by the fluidizing effects the iodine and excess calcium have upon the slag during the holding period that facilitates the movement of the molten uranium particulates in the slag.

Upon completion of the reduction operation, the reaction vessel and its contents are cooled and then the reaction cake is treated to separate the uranium particles from the slag which normally comprises metallic calcium, calcium oxide, and iodine in the form of calcium iodide. Satisfactory results have been obtained by initially crushing the reaction cake in a suitable mechanism such as a conventional jaw-crusher, and thereafter leaching the crushed cake with a suitable acid such as acetic acid. Acetic acid is preferable since it produces calcium acetate to buffer the leaching solution at a pH 5 to 8 and also has a negative heat of solution to prevent overheating for minimizing the oxidation of the uranium metal that readily occurs when the temperature of the leach solution exceeds about 30° C. $CO_2$ is also used to keep the solution below 30° C. and to provide a $CO_2$ blanket to prevent oxidation of the metal. A leaching solution of four parts water and one part glacial acetic acid has been found to be satisfactory. The products remaining after the leaching step may then be subjected to a dilute nitric acid pickling solution (one part 70 percent nitric acid-nine parts water) and then rinsed with water. The uranium powder decanted from these solutions may then be dried in a heated environment under vacuum or, if desired, by contacting the powders with acetone. The dried powders may then be classified by using conventional screening procedures. The dried uranium is essentially non-pyrophoric. However, like many fine powders it can and will burn under the right conditions. Drying and storage of the powder under argon is recommended.

In order to provide a better understanding of the present invention, a typical reduction operation using the process of this invention is set forth below.

A bomb-reduction charge is prepared by admixing 4 kilograms (kgs.) of uranium dioxide powder with 3.6 kgs. of particulate uranium metal seed in a size range of +44–149 microns, 1.5 kgs. of crystalline iodine. The particulate uranium metal used in this reaction batch is advantageously derived from a previous bomb-reduction operation. Also, the quantity of calcium metal used in this mix is 19 percent in excess of the stoichiometric quantity. Upon completing a thorough blending of the reactants they are charged into a reaction vessel and heated to effect the reduction. This heating of the reaction vessel and its contents is accomplished at a rate of 25° C. per minute until a temperature of 500° C. is attained and then at a rate of 10° C. per minute until an exothermic reaction becomes evident (usually at a temperature of about 800° C. when controlled heating is utilized). At this point the heating is accelerated as rapidly as possible to 1200° C. and maintained there for two hours.

After completing the high-temperature soak the vessel and the reactants are cooled to freeze the reaction cake which is then removed from the reaction vessel. The cake is then crushed in a suitable crushing mechanism such as an impact ram capable of exerting a force of about 10,000 p.s.i. upon the cake. Dry Ice is also crushed along with the cake so as to provide a cooling effect upon the cake as well as to provide blanket of inert gas about the cake to inhibit oxidation of the metal in the crushed cake. This crushed cake is then placed into a rotary dissolver containing 8 gallons of an acid solution made up of acetic acid and water at a ratio of 1 part acid to 4 parts water. The crushed cake is placed into the acid solution together with Dry Ice fragments at a rate sufficiently slow so as to assure that the temperature of the solution never exceeds about 30° C. due to uranium metal oxidation problems. The rotary dissolver is then operated for a duration of approximately 3.5 hours which is normally sufficient to allow the acid solution to leach the cake by dissolving the calcium, iodine, and compounds thereof. After completing this leaching operation the solids, i.e., uranium metal powders, in the acid solution are allowed to settle for approximately 5 minutes and then the acid solution is decanted. These uranium powders are then successively contacted with a dilute nitric acid pickling solution consisting of 1 part 70 percent nitric acid and 9 parts water, and with water to rise the uranium product.

The uranium powders are then dried by contacting the powder with acetone. After the drying step the powders are screened in argon to classify the spheroidal uranium powders.

The actual yield in uranium powders resulting from this reduction is 6.921 kgs. of a possible yield of 7.08 kgs. This represents a yield of 97.75 percent of theoretical.

The classification of the spheroidal uranium powders resulted in the size distribution set forth in the following table.

TABLE

| Particle size range (microns) | Weight (gms.) | Fraction (percent) |
|---|---|---|
| −44 | 1,096 | 15.48 |
| −74 +44 | 900 | 12.71 |
| −94 +74 | 1,007 | 14.22 |
| −125 +94 | 730 | 10.31 |
| −149 +125 | 992 | 14.01 |
| −177 +149 | 802 | 11.33 |
| −250 +177 | 427 | 6.03 |
| −420 +250 | 907 | 12.81 |
| −821 +420 | 60 | 0.85 |

It will be seen that the process of the present invention for producing spheroidal uranium metal by bomb-reduction sets forth a significant improvement over the bomb-reduction procedure previously employed for the same purpose. This improvement is largely due to the fact that not only is there produced a greater percentage of the spheroidal product in the desired size range of +149−420 microns but there is also produced a quantity of spheroidal powder in the +44−149 micron size range that is advantageously employed as seed material in subsequent reductions. The spheroidal uranium powder produced by this process enjoys high density in that the density of these powders is approximately 18.7 gms./cc. of a possible 19.05 gms./cc., theoretical.

As various changes may be made in the form and arrangement of the steps herein without departing from the spirit and scope of the invention, it is to be understood that all matter herein is to be interpreted as illustrative and not in a limiting sense.

What is claimed is:

1. In the art of producing spheroidal uranium metal powders by the bomb-reduction of uranium oxide powder with a reducing agent, an improved reduction process for producing such spheroidal powders, comprising the steps of admixing uranium dioxide powder with particulate uranium metal and a reducing agent consisting of calcium metal powder in a quantity in excess of the stoichiometric quantity, confining the mixture, heating the confined mixture to a temperature sufficient to effect an exothermic reaction of the calcium metal with the uranium dioxide, and thereafter further heating the confined mixture to a temperature in the range of 1175° C. to 1225° C., maintaining the confined mixture at essentially said maximum temperature for a duration sufficient to effect predetermined coalescence and spheriodization of the uranium metal produced by the reaction and the particulate uranium metal in the mixture, cooling the reacted mixture, and thereafter recovering the spheroidal uranium product.

2. The process claimed in claim 1, including the additional step of blending crystalline iodine into the mixture prior to the confinement thereof.

3. The process claimed in claim 2, wherein the ratio of the particulate uranium metal to the uranium dioxide powder in the mixture is about 9-to-10 by weight.

4. The process claimed in claim 3, wherein the particulate uranium metal is in a size range of about 44 to 149 microns.

5. The process claimed in claim 3, wherein the calcium metal powder quantity is in a range of about 18 to 22 percent in excess of the stoichiometric quantity, and wherein the quantity of crystalline iodine added to the mixture corresponds to about 4 to 8 percent by weight of the uranium dioxide powder in the mixture.

6. The process claimed in claim 5, wherein the maximum temperature is maintained for a duration of about 0.5 to 5 hours.

References Cited
UNITED STATES PATENTS 1,704,257   3/1929   Marden et al. _____ 75—84.1

CARL D. QUARFORTH, *Primary Examiner.*

M. J. SCOLNICK, *Assistant Examiner.*